July 9, 1935.  L. E. SIMON  2,007,816
PRESSING MACHINE
Filed Oct. 29, 1934  2 Sheets-Sheet 1
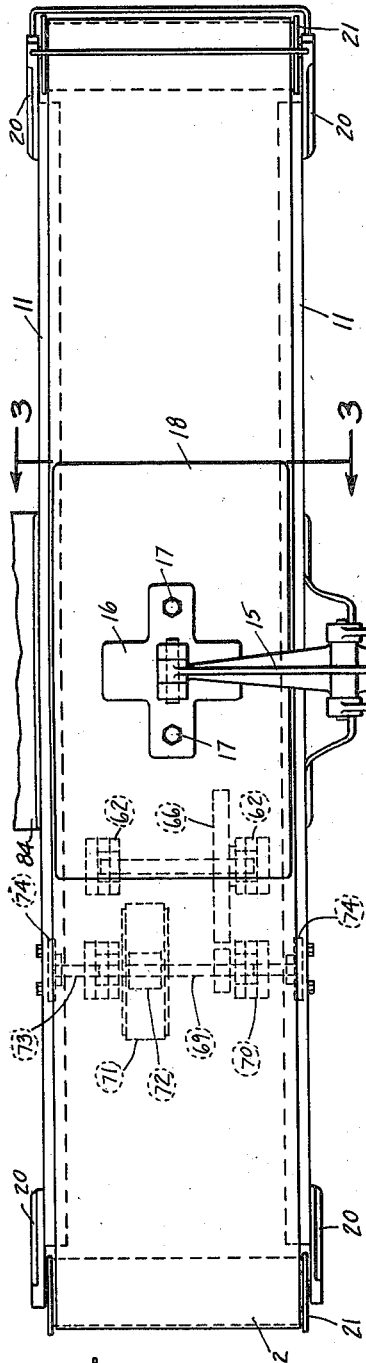
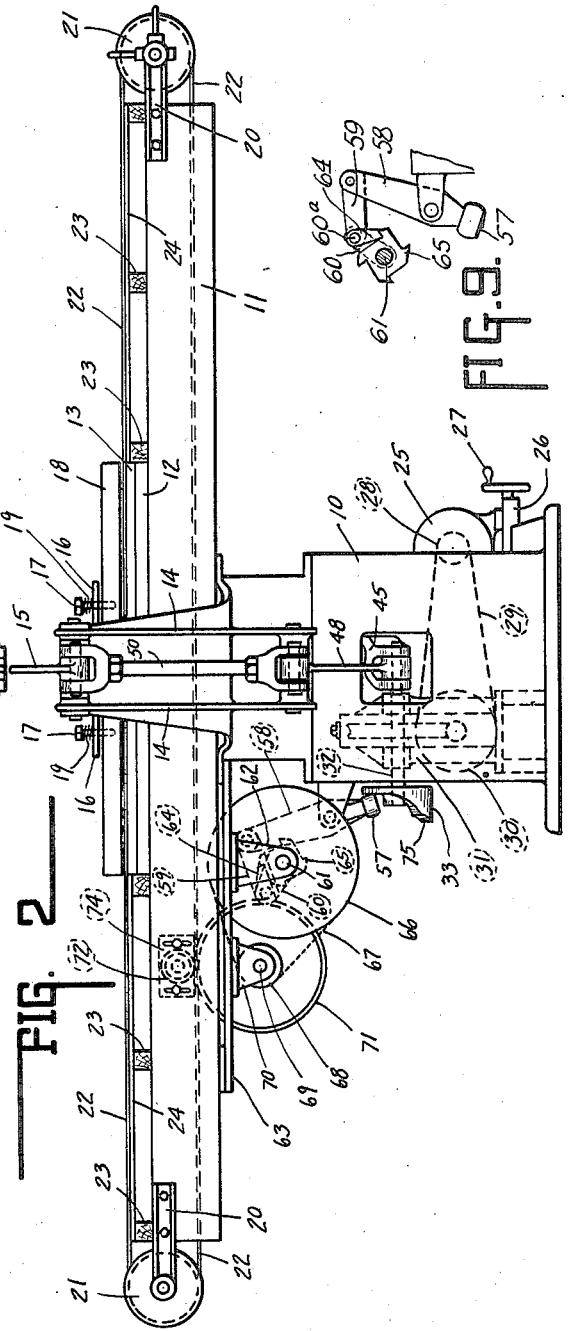
INVENTOR.
LEE E. SIMON.
BY Lockwood Goldsmith & Galt.
ATTORNEYS.

July 9, 1935.　　　　　　　L. E. SIMON　　　　　　2,007,816
PRESSING MACHINE
Filed Oct. 29, 1934　　　　2 Sheets-Sheet 2
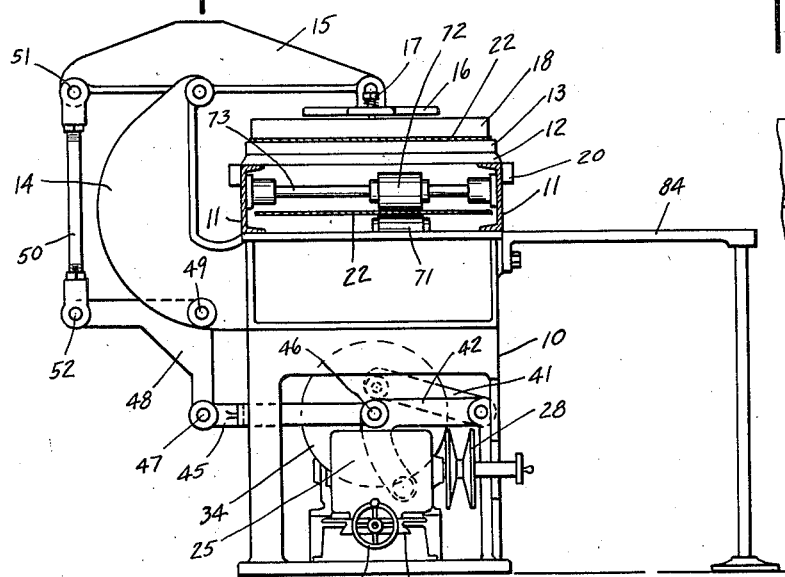
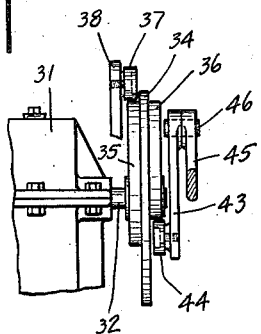
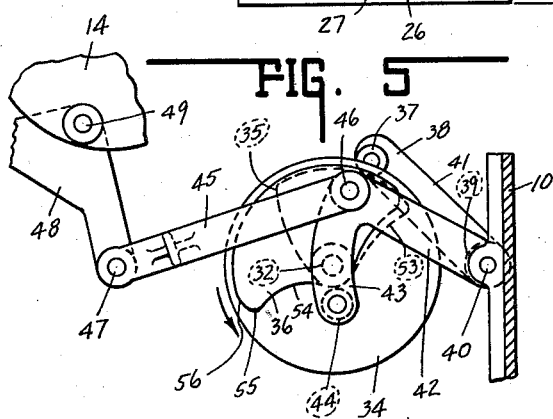
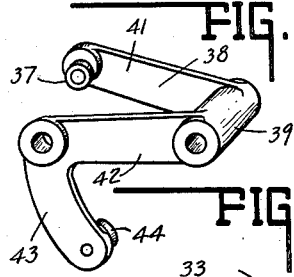
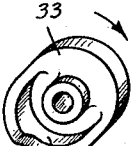
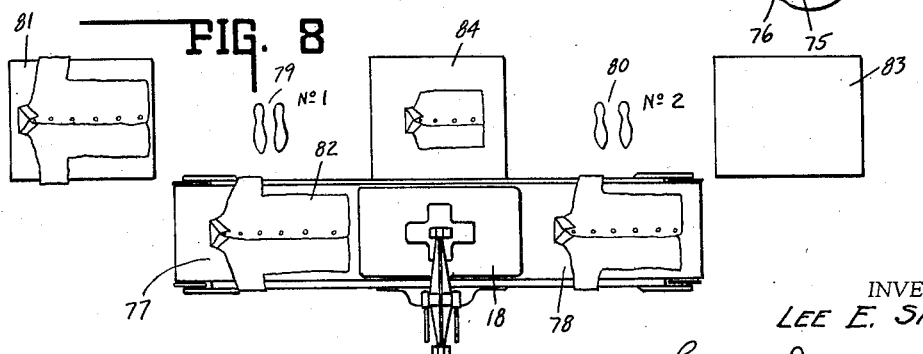
INVENTOR.
LEE E. SIMON.
BY Lockwood Goldsmith & Galt
ATTORNEYS.

Patented July 9, 1935

2,007,816

UNITED STATES PATENT OFFICE 2,007,816

PRESSING MACHINE

Lee E. Simon, Bedford, Ind., assignor to W. F. Meyers Company, Inc., Bedford, Ind., a corporation Application October 29, 1934, Serial No. 750,428

3 Claims. (Cl. 68—9)

This invention relates to a pressing machine and has for its object the production of a machine adapted to press a large number of garments or similar articles in a given time and which is simple and inexpensive in construction and operation. To that end the invention comprises a machine having a cooperating platen and pressing shoe, a conveyor adapted to move the articles to be pressed from a receiving station to a pressing position between the shoe and platen and thence to a delivery station, together with the necessary mechanical apparatus for operating the pressing shoe and conveyor in timed relation.

One feature of the invention resides in the cooperation of the conveyor and platen and shoe by means of which the work is rapidly fed to the pressing position, pressed and removed therefrom.

Another feature of the invention resides in a novel form of drive connection for the conveyor by means of which the conveyor is positively advanced but is left free for independent movement during the pressing operation.

Another feature of the invention resides in the mechanism provided for operating the pressing shoe by means of which the weight of the shoe assists in the pressing operation and so reduces the peak load on the motor used for moving the shoe.

Another feature of the invention resides in the fact that the conveyor and shoe are operated from a single power source in timed relation in a series of automatically repeated cycles. No action by the operator is required to initiate a new cycle upon the completion of a previous cycle. The only work required of the operators is to arrange the goods upon the receiving end of the conveyor during the pressing operation and to remove the pressed articles from the delivery end when pressed.

Other objects and features of the invention will be understood from the accompanying drawings and the following specification and claims:

Fig. 1 is a plan view of the pressing machine in one of its preferred forms. Fig. 2 is a rear elevational view of the same. Fig. 3 is a sectional view on the line 3—3 of Fig. 1. Fig. 4 is an elevational view of certain cam mechanism and linkage used for operating the pressing shoe. Fig. 5 is an elevational view of the same shown at right angles to Fig. 4. Fig. 6 is a perspective view of one of the members shown in Figs. 4 and 5. Fig. 7 is a perspective view of a cam used in the control of the conveyor movements. Fig. 8 is a plan view on a reduced scale of a machine in operation showing one arrangement of operators' stations and work receivers by means of which rapid operation is secured. Fig. 9 is a fragmentary elevational view of a ratchet and pawl mechanism used for advancing the conveyor.

The stationary frame of the machine shown by way of illustration in the drawings consists of a box-like sub-structure 10 upon which there are secured two longitudinal channel members 11. A plate 12 resting upon the upper surfaces of the channel members 11 carries a resilient pad or platen 13. The substructure 10 is provided with a pair of upwardly extending brackets 14 upon the upper end of which there is pivotally mounted a rocker arm 15. The said rocker arm projects above the platen and has pivotally secured thereto a plate 16. Bolts 17 pass loosely through suitable holes in the plate 16 and threadedly engage a pressing shoe 18. The said bolts are provided with compression springs 19 engaging the upper surface of the plate 16 and the undersurfaces of the boltheads and thus resiliently supporting the pressing shoe 18 upon the plate 16 but permitting limited relative movement between said shoe and plate. It will be seen that the pressing shoe 18 is positioned above the platen and may cooperate therewith to press articles placed between the platen and shoe. The shoe may be heated by any well-known means, such as an electrical resistance element enclosed within the same, or by a method of steam heating, neither of which is shown in the drawings.

The outer ends of the channel members 11 carry bearing brackets 20 which rotably support a pair of conveyor rollers 21. A conveyor, consisting preferably of a flexible belt 22 of canvas or similar material, is trained about the rollers 21. The upper run of said belt passes between the platen and pressing shoe while the lower run thereof passes beneath the platen and between the channel members 11. Cross pieces 23 carried upon the channel members 11 support plates 24 in turn supporting the conveyor belt through that portion of the upper run where the belt is not supported by the platen.

Partially enclosed within the sub-structure 10 there is an electric motor 25 mounted upon a sliding base 26 whose position may be adjusted by a hand wheel 27 in a well-known manner. The motor carries a pulley 28 herein shown as the well-known adjustable diameter type of pulley used for varying speed operation. A belt 29 is trained about the pulley 28 and about a pulley 30 carried by the worm shaft of a worm gear unit 31 mounted within the sub-structure 10. The worm wheel of said unit is mounted on a shaft 32 which carries at one end a cam 33 and at its opposite end a cam disc 34, best illustrated in Figs. 4 and 5. Thus, the motor 25 rotates the cam 33 and the cam disc 34 and the speed of rotation thereof may be varied by varying the position of the motor base 26.

The cam disc 34 carries upon its opposite faces irregularly shaped cams 35 and 36. A follower in the shape of a roller 37 operates upon the surface of the cam 35, and a similar follower roller 44 operates upon the cam 36. The said rollers are carried upon the two arms 41 and 42 respectively of a bifurcated member 38 shown in detail in Fig. 6. The said member is provided with a hub 39 pivotally mounted upon the substructure 10 by a pivot pin 40 and the arm 42 of said member is provided with a downwardly extending portion 43 carrying the roller cam follower 44. The cams 35 and 36 are so shaped that the bifurcated member 38 in rocked upon its pivotal mounting as the shaft 32 is rotated.

A link 45 has one end pivotally connected by means of a pin 46 to the arm 42 and the opposite end thereof is pivotally connected by means of a pin 47 to the lower end of an L-shaped rocker arm 48. The rocker arm 48 is pivotally mounted upon the bearing brackets 14 at 49. A link 50, adjustable as to length, is connected at its upper end to the rocker arm 15 by a pivot pin 51 and at its lower end to the rocker arm 48 by a pin 52.

By means of the construction just described, when the member 38 is moved downwardly, the arm 42 and the link 45 approach a substantially aligned position as shown in Fig. 3. In this position the pressing shoe is pressed downwardly against the garments upon the conveyor beneath the shoe. Due to the alignment of the arm 42 and link 45, a toggle action is obtained which gives a large pressure upon the work with a small expenditure of power. The amount of said pressure may be adjusted by varying the length of the link 50. It will also be apparent that when the member 38 is raised by the cam 35, the alignment of the link 45 and the arm 42 is broken and the pressing shoe is quickly raised from the work.

The downward movement of the pressing shoe into engagement with the work is produced largely by its own weight when the roller 37 reaches an arcuate portion 53 of the cam 35. During this movement, the roller 37 rides on the arcuate portion 53 of the cam 35 and thus controls the gravity drop of the shoe. When the roller 44 has reached a shoulder 55 on the cam 36 the shoe has engaged the work. Thereupon, the additional pressure for pressing the work is supplied by a portion 56 of the cam 36 engaging the roller 44 and forcing the same downwardly an additional distance to secure the alignment of the arm 42 and the link 45. The upward movement of the shoe, since it is caused by simply breaking a toggle joint, requires a very small peak power load and, since the lowering of the shoe is largely accomplished by gravity, the peak power load on the motor is relatively small.

The cam 33, shown in detail in Fig. 7, cooperates with a cam follower 57 carried upon a lever arm 58 pivotally mounted upon the substructure 10. The upper end of the lever 58 is pivotally connected to a link 59, in turn connected by a pin 60a to a link 60 freely mounted upon a shaft 61. The shaft 61 is mounted in bearings 62 secured to a plate 63 fastened beneath the channel members 11. A pawl 64 is pivotally mounted upon the pin 60a and engages a ratchet wheel 65 mounted upon the shaft 61. A sprocket 66 is also mounted upon the shaft 61 and carries a chain 67 driving a sprocket 68 upon a shaft 69. The shaft 69 is supported in bearings 70 secured to the plate 63 and carries a friction wheel 71 having a face of sponge rubber or other suitable friction material bearing against the lower surface of the lower run of the conveyor 22. A similar friction roller 72 is mounted upon a shaft 73 supported on bearings 74 adjustably mounted on the channel members 11. Said roller engages the upper surface of the lower run of the conveyor 22 immediately above the roller 71, and, by adjustment of its bearings 74, the said rollers are caused to tightly grip the conveyor.

The cam 33 is formed with an upraised lip 75 engaging the follower 57 through a portion of the revolution of the cam. When this engagement occurs, the arm 58 is rocked and, through the pawl and ratchet, rotates the sprocket 66 through a portion of a revolution. This in turn rotates the shaft 69 and the friction roller 71 and, by the frictional engagement of the rollers 71 and 72 with the conveyor, the latter is moved a predetermined distance. When the follower 57 leaves the lip 75, the pawl returns to its initial position due to the unbalanced weight of the lever 58. If desired, however, a spring or similar means may be used to return the pawl to its initial position. As will be seen particularly in Fig. 7, the lip 75 is formed with a shoulder 76. In the rotation of the cam in the direction of the arrow in Fig. 7, the follower 57 reaches the shoulder 76 at the most advanced part of its forward stroke, moving the pawl 64 to the position shown in Fig. 9. Upon passing the shoulder, it immediately moves inward a slight distance, permitting the pawl 64 to be retracted out of engagement with the driving faces of the teeth of the ratchet 65. This occurs prior to the downward movement of the pressing shoe 18. Thus, at the time of the pressing operation, there is no rigid mechanical connection between the conveyor and its primary driving mechanism. The flexible conveyor is then free to move in either direction as it is pressed downwardly by the pressing shoe against the resilient platen without danger of strain or breakage of any parts of the machine.

In the operation of the device, in the manner shown in Fig. 8, the portion 77 of the conveyor to the left of the pressing shoe 18 may be considered as a receiving station and the portion 78 to the right may be considered as the delivery station. One operator, who may be called operator No. 1, is positioned as indicated at 79 and a second operator, No. 2, is positioned as indicated at 80. A supply of articles to be pressed is placed upon a receiving table 81 within convenient reach of operator No. 1. During each pressing operation, operator No. 1 arranges an article 82 upon the conveyor at the receiving station. Upon the next movement of the conveyor the said article is moved beneath the pressing shoe, the conveyor is stopped, the shoe is moved downwardly and pressed against the article and is then returned to its upper position to permit further conveyor movement. When the succeeding movement of the conveyor takes place, the garment just pressed is moved to the delivery station within reach of operator No. 2, who removes the same and places it upon a convenient receiver, such as a table 83.

In the pressing of many garments, such as shirts, two operations are required, a first press before the shirt is folded and a second press thereafter. In operating the machine for this class of work, a supply of unpressed shirts is placed upon the table 81. These shirts are passed through the machine, received by operator No. 2, folded and placed upon the receiver 84 within convenient reach of operator No. 1. The said receiver 84 is preferably a table built in as part of the machine, as shown in Fig. 3. When a desired number of shirts have been given their first press and have been folded and placed upon table 84, operator No. 1, without moving from her position, places the same upon the conveyor at the receiving station in groups of three or more and they are passed through the machine for their second pressing. Operator No. 2 removes the same, inspects and boxes them and places them upon a receiver 83, which may be a standard truck conveyor. The use of the receiving table 84 thus permits the machine to be used for double pressing with a very small amount of handling of the articles.

From the foregoing description, it will be apparent that the machine is entirely automatic in operation. Each cycle of operation follows the preceding cycle automatically as long as the motor continues to operate. The speed of operation, therefore, does not depend primarily upon the operator but upon the set speed of the machine. At the same time, the speed may be varied by the variable speed drive to suit the requirements of the particular articles being pressed or to allow for the experience or lack of experience of the operators. By use of the conveyor, it becomes unnecessary for the operator to place her hands beneath the hot pressing plate at any time. This gives a safety factor which makes it possible to use the fully automatic operation since it would not be safe to operate the pressing shoe automatically if the operator were required to manually arrange the goods beneath the pressing shoe.

The machine is simple in construction and in operation. No high degree of skill is required of the operator other than manual dexterity in arranging the goods. The machine is particularly adapted for the pressing of shirts but is useful for many other purposes. In the first pressing of shirts it is desirable that the sleeves hang over the sides of the conveyor and the machine is accordingly arranged to provide free passage for the sleeves without danger of catching on any part of the machine. To this end the bearing arms 14 are formed as best shown in Fig. 3 to provide a space between the arms and the nearest channel member 11.

The foregoing specification describes a preferred form of the invention. However, the details thereof may be varied between wide limits by those skilled in the art without departing from the scope of the invention as defined in the following claims.

The invention claimed is:

1. In a pressing machine, the combination of a movable pressing shoe, a cam having two cam surfaces thereon, a pivotally mounted member having two arms, a follower carried by each of said arms, each of said followers engaging one of said cam surfaces, a link pivotally connected to one of said arms and forming therewith a toggle linkage, and connections between the opposite end of said link and said shoe for forcing the latter into pressing position when said toggle linkage is moved substantially into alignment and for retracting said shoe when said alignment is broken, one of said cam surfaces being shaped to move said linkage into alignment and the other being shaped to subsequently break said alignment.

2. In a pressing machine, the combination of a frame, a movable pressing shoe, a constantly rotated cam disc, a rockable member pivotally mounted on said frame and having an arm extending on each side of said cam disc, cam surfaces on the opposite sides of said disc engaging said arms and shaped to rock said rockable member upon its pivotal mounting, a link connected to one of said arms and forming therewith a toggle linkage, connections between the opposite end of said link and said shoe for forcing the latter into pressing position when said rockable member is rocked to bring the toggle linkage substantially into alignment and to retract said shoe when said member is rocked to break said alignment.

3. In a pressing machine having a platen and a cooperating pressing shoe, the combination of a conveyor belt passing between said platen and shoe, power means, and a driving connection between said power means and said conveyor, said connection including a ratchet and pawl and a cam operating to move said pawl for advancing the conveyor, and said cam being shaped to retract said pawl out of engagement with the driving faces of the teeth of the ratchet after the advance stroke thereof to permit free movement of the conveyor during the pressing operation.

LEE E. SIMON.